US012027747B2

(12) United States Patent
Bontzos et al.

(10) Patent No.: US 12,027,747 B2
(45) Date of Patent: Jul. 2, 2024

(54) ANTENNA ASSEMBLY

(71) Applicant: PARRY LABS LLC, Arlington, VA (US)

(72) Inventors: Konstantinos M. Bontzos, Palmetto, FL (US); David Daniel, Winter Garden, FL (US); Paul Virgilio, Parkville, MD (US)

(73) Assignee: PARRY LABS LLC, Alexandria, VA (US)

(*) Notice: Subject to any disclaimer, the term of this patent is extended or adjusted under 35 U.S.C. 154(b) by 0 days.

(21) Appl. No.: 18/083,528

(22) Filed: Dec. 18, 2022

(65) Prior Publication Data

US 2023/0378630 A1 Nov. 23, 2023

Related U.S. Application Data

(60) Provisional application No. 63/294,354, filed on Dec. 28, 2021.

(51) Int. Cl.
*H01Q 1/08* (2006.01)
*H01Q 13/04* (2006.01)

(52) U.S. Cl.
CPC ............ *H01Q 1/085* (2013.01); *H01Q 13/04* (2013.01)

(58) Field of Classification Search
CPC ............ H01Q 1/085; H01Q 1/40; H01Q 9/30; H01Q 13/04
See application file for complete search history.

(56) References Cited

U.S. PATENT DOCUMENTS 9,666,950 B1 * 5/2017 Johnson ................ H01Q 13/04
2013/0106667 A1 * 5/2013 Fenn ..................... H01Q 1/525 343/866

* cited by examiner

*Primary Examiner* — Hoang V Nguyen
(74) *Attorney, Agent, or Firm* — Von Rohrscheidt Patents

(57) ABSTRACT

An antenna assembly including flexible antenna elements connected to a non-flexible antenna element which connects to a counterpoise where the non-flexible antenna element is between the counterpoise and the flexible antenna elements. The flexible antenna elements are a plurality of peripheral flexible antenna elements and a central flexible antenna element. The plurality of peripheral flexible antenna elements are separated from and surrounding the central flexible antenna element. The non-flexible antenna element is a biconical antenna, formed from two tapered shapes connected at a central feed point such that a constant electrical impedance as the currents radiate outward from the central feed point. A total length of the flexible antenna elements connected to the non-flexible antenna element is ≤43.0 cm, and the flexible antenna elements connected to the non-flexible antenna element has a realized gain of at least 2 dB over at least a frequency range of 200-7000 MHz.

18 Claims, 12 Drawing Sheets

ANTENNA ASSEMBLY

RELATED APPLICATIONS

This application claims priority from and incorporates by reference U.S. Provisional Patent Application 63/294,354 filed on Dec. 28, 2021.

STATEMENT REGARDING FEDERALLY SPONSORED RESEARCH

This invention was made with government support under Contract #W911NF-15-D-0008 awarded by US Army. The government has certain rights in the invention.

FIELD OF THE INVENTION

The present invention relates generally to an antenna assembly, and more particularly, to an antenna assembly for a portable counter radio controlled improvised explosive device system.

BACKGROUND

Radio Controlled Improvised Explosive Devices (RCIEDs) have become a common threat to the soldiers of today. To counter this threat, various counter-RCIED systems have been developed including systems which jam cell phone or other electronic signals that detonate the RCIEDs. Unfortunately, effective jamming currently requires a heavy and bulky counter-RCIED system. The weight and bulk of these counter-RCIED systems makes them impractical in many contexts and especially when they need to be man-portable. Reducing the weight and/or bulk of counter-RCIED systems has so far proven to be impractical because the reduction in the jamming has basically rendered such counter-RCIED systems ineffective. Accordingly, there is a strong need in the art to improve the jamming efficacy of the counter-RCIED systems while reducing their weight and bulk.

SUMMARY OF THE INVENTION

An aspect of the present invention is to provide antenna assembly including flexible antenna elements connected to a non-flexible antenna element, and a counterpoise connected to the non-flexible antenna element such that the non-flexible antenna element is between the counterpoise and the flexible antenna elements. The flexible antenna elements are a plurality of peripheral flexible antenna elements and a central flexible antenna element, and the plurality of peripheral flexible antenna elements are separated from and surrounding the central flexible antenna element. The non-flexible antenna element is a biconical antenna, formed from two tapered shapes connected at a central feed point having a constant electrical impedance as the currents radiate outward from the central feed point. A total length of the flexible antenna elements connected to the non-flexible antenna element is no greater than 43.0 cm, and the flexible antenna elements connected to the non-flexible antenna element has a realized gain of at least 2 dB over at least a frequency range of 200 MHz to 7 GHz. Advantageously, the total length of the flexible antenna elements connected to the non-flexible antenna element may be no greater than 41.7 cm, or more advantageously no greater than 40.4 cm. Advantageously, a total weight of the flexible antenna elements connected to the non-flexible antenna element may be no greater than 1.36 kg, or more advantageously may be no greater than 1.13 kg, or even more advantageously may be no greater than 0.91 kg. Advantageously, the flexible antenna elements connected to the non-flexible antenna element may have the realized gain of at least 1 dB over at least a frequency range of 100 MHz to 7 GHz, or more advantageously, the flexible antenna elements connected to the non-flexible antenna element may have the realized gain of at least 0 dB over at least a frequency range of 30 MHz to 7 GHz. The flexible antenna elements connected to the non-flexible antenna element may be a single antenna. The plurality of peripheral flexible antenna elements may be equidistance from the central flexible antenna element. The plurality of peripheral flexible antenna elements may be spaced an equal number of radians from each other relative to the central flexible antenna element. The central flexible antenna element may be identical to each of the plurality of peripheral flexible antenna elements, or the central flexible antenna element may be different from each of the plurality of peripheral flexible antenna elements. The antenna assembly may also include an electronics box where the non-flexible antenna element is connected to an electronics box, and the electronics box acts as a counterpoise. The antenna assembly may be man-pack portable or man-portable. The non-flexible antenna element may be defined by the equation $Z(r, \alpha, \delta)=\delta \times r^{\alpha}$, where r, is the radial distance from the center of the cone, $\alpha$ is the taper profile exponent factor, and $\delta$ is the height of the taper profile from the central feed point.

Another aspect of the present invention is to provide an antenna assembly including flexible antenna elements connected to a non-flexible antenna element, and a counterpoise connected to the non-flexible antenna element such that the non-flexible antenna element is between the counterpoise and the flexible antenna elements. The flexible antenna elements are a plurality of peripheral flexible antenna elements and a central flexible antenna element, the plurality of peripheral flexible antenna elements are separated from and surrounding the central flexible antenna element. The non-flexible antenna element is a biconical antenna including two cone tapers. A total length of the flexible antenna elements connected to the non-flexible antenna element is no greater than 40.4 cm, and a total weight of the flexible antenna elements connected to the non-flexible antenna element is no greater than 0.91 kg. The flexible antenna elements connected to the non-flexible antenna element has a realized gain of at least 0 dB over at least a frequency range of 30 MHz to 7 GHz. The plurality of peripheral flexible antenna elements are equidistance from the central flexible antenna element and the plurality of peripheral flexible antenna elements are spaced an equal number of radians from each other relative to the central flexible antenna element. The antenna assembly is a single antenna.

Another aspect of the present invention is to provide an antenna assembly including flexible antenna elements connected to a non-flexible antenna element, and a counterpoise connected to the non-flexible antenna element such that the non-flexible antenna element is between the counterpoise and the flexible antenna elements. The flexible antenna elements are a plurality of peripheral flexible antenna elements and a central flexible antenna element, the plurality of peripheral flexible antenna elements are separated from and surrounding the central flexible antenna element. The non-flexible antenna element is defined by the equation $Z(r, \alpha, \delta)=\delta \times r^{\alpha}$, where r, is the radial distance from the center of the cone, $\alpha$ is the taper profile exponent factor, and $\delta$ is the height of the taper profile from the central feed point. The flexible antenna elements connected to the non-flexible antenna element has a realized gain of 0 dB over at least a frequency range of 30 MHz to 7 GHz. The plurality of peripheral flexible antenna elements are equidistance from the central flexible antenna element and the plurality of peripheral flexible antenna elements are spaced an equal number of radians from each other relative to the central flexible antenna element. The antenna assembly is a single antenna.

BRIEF DESCRIPTION OF THE DRAWINGS

The invention will be described in detail with reference to the following drawings in which like reference numerals refer to like elements wherein.

DETAILED DESCRIPTION

Figure 1:
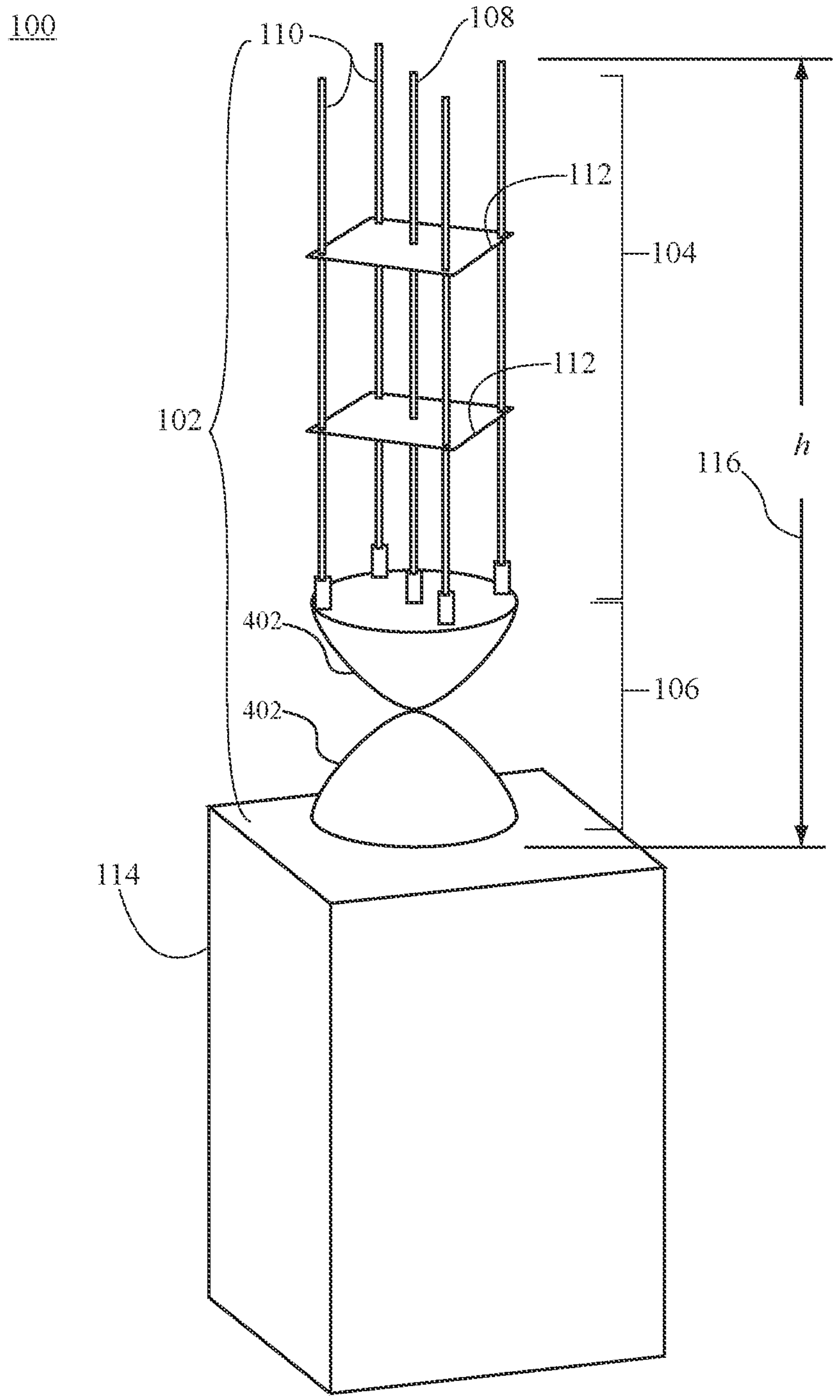
FIG. 1. illustrates a counter Radio Controlled Improvised Explosive Devices (counter-RCIED) system.

The present invention provides a counter Radio Controlled Improvised Explosive Devices (counter-RCIED) system 100 having an antenna assembly 102 with flexible antenna elements 104 and a non-flexible antenna element 106 connected to each other to form a single antenna as illustrated in FIG. 1. The flexible antenna elements 104 include a central flexible antenna element 108 surrounded by a plurality of peripheral flexible antenna elements 110. Additionally, one or more optional fixation elements 112 may be included to help fix the spacing between the flexible antenna elements 104 to improve the structural stability of the flexible antenna elements 104. The counter-RCIED system 100 also includes an electronics box 114.

Each of the flexible antenna elements 104 may be made by from any suitable flexible antenna including, but not limited to, coated spring material which is cut to the length required to construct the antenna. The examples herein were purchased from Hytech Spring & Machine Corporation and labeled as outer coil body including copper plating and shrink tube. Alternatively, other metallic materials may also be used. For omni-directional jamming, the plurality of peripheral flexible antenna elements 110 are identical to each other and are placed equidistance from the central flexible antenna element 108. The number of flexible antenna elements (number of peripheral flexible antenna elements 110 plus one central flexible antenna element 108) may be between 4 and 9, advantageously between 4 and 6, and most advantageously 5. Each flexible antenna element 104 has a length advantageously less than or equal to 30.48 cm (12"), and more advantageously in the range of 20.32 to 30.48 cm (8" to 12"). An exemplary flexible antenna element has a length of 27.305 cm (10.75"), which corresponds to the best performance at 50 MHz. Alternatively, best performance could be set at other frequencies and may vary based upon alternative constructions for the flexible antenna elements 104. These flexible antenna elements 104 serve to provide low frequency coverage. The flexible antenna elements 104 are made flexible instead of rigid because this helps prevent damage to the antenna assembly 102 typically caused by going through doorways, hallways, other shorter or cramped spaces, or caused by other impacts to the flexible antenna elements 104. The electronics box 114 itself acts as a counterpoise to the flexible antenna elements 104 to cover the other half of what can be thought of as a classic dipole antenna.

For simplicity, the central flexible antenna element 108 may be identical to the plurality of peripheral flexible antenna elements 110. Alternatively, the central flexible antenna element 108 may be different than the plurality of peripheral flexible antenna elements 110.

Figure 12:
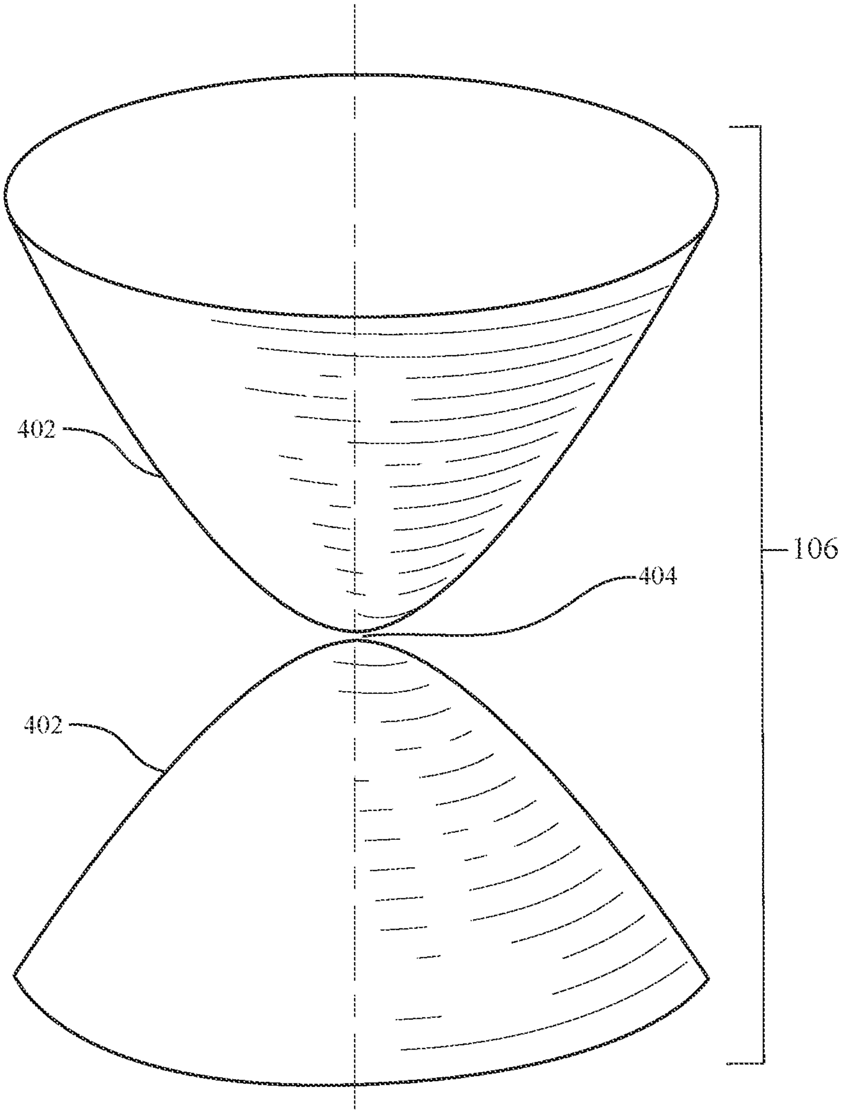
FIG. 12 illustrates an exemplary non-flexible antenna element.

The non-flexible antenna element 106 may be tapered shapes/cone tapers such as a biconical antenna. The geometry of the tapered shapes/cone tapers, antenna feed, and cone spacing may be designed for broadband operation and especially for high frequency operation to support system requirements. Advantageously, software such as Ansys HFSS by Ansys, Inc. may be used to develop suitable designs. FIG. 12 illustrates an exemplary non-flexible antenna element 106 including two tapered shapes 402 having a central coaxial feed point 404. The non-flexible antenna element 106 includes an upper shape (e.g., cone) and a lower shape (e.g., cones) on either side of the central coaxial feed point 404 located in the center of the non-flexible antenna element 106. The tapered shapes 402 may be made from aluminum or any other suitable electrically conductive material.

This tapered shape is mathematically described by a power function, $Z(r, \alpha, \delta)=\delta \times r^{\alpha}$, where r, is the radial distance from the center of the cone, $\alpha$ is the taper profile exponent factor, and $\delta$ is the height of the taper profile. This tapered shape 402 maintains a constant electrical impedance as the currents radiate outward from the central coaxial feed point 404. Maintaining a constant electrical impedance is important for broadband and high frequency operation of the non-flexible antenna element 106. For the exemplary embodiment below, the domain of r is between 0.08128 cm (0.032"), and 4.191 cm (1.65"), $\alpha$ is 1.48056, and $\delta$ is 4.4276518 cm (1.74317").

Keeping the antenna assembly 102 to a smaller height reduces weight and bulk. The antenna assembly 102, measured from a farthest end of the flexible antenna elements 104 to a first point of the non-flexible antenna element 106 above the electronics box 114 should have a height 116 of no larger than 43 cm (16.9"), advantageously no larger than 41.7 cm (16.4"), or even more advantageously no larger than 40.4 cm (15.9"). This antenna assembly 102 represents a substantial improvement over conventional antenna assemblies also used in counter-RCIED systems that can have a height of 121.9 cm (48.0") or more. The weight of the antenna assembly 102 should be kept as low as possible to make the counter-RCIED system 100 lighter, especially since such counter-RCIED systems 100 are advantageously man-portable. The antenna assembly 102 should have a weight of no larger than 1.36 kg (3.0 lbs.), advantageously no larger than 1.13 kg (2.5 lbs.), or even more advantageously no larger than 0.91 kg (2.0 lbs.).

The antenna assembly 102 is omnidirectional and broadband. Broadband as used herein covers a frequency range of up to 7 GHz and above and down to 200 MHz, or more advantageously down to 100 MHz or even more advantageously down to 50 MHz and below. The antenna assembly 102 is a single antenna rather than a plurality of antennas coupled together as was done in the prior art. The coupling of antennas results in coupling losses (e.g., from a resistive coupler) which lowers the realized gain. The realized gain of the single antenna of the present invention greatly outperforms the plural combined antennas of the prior art.

Figure 2:
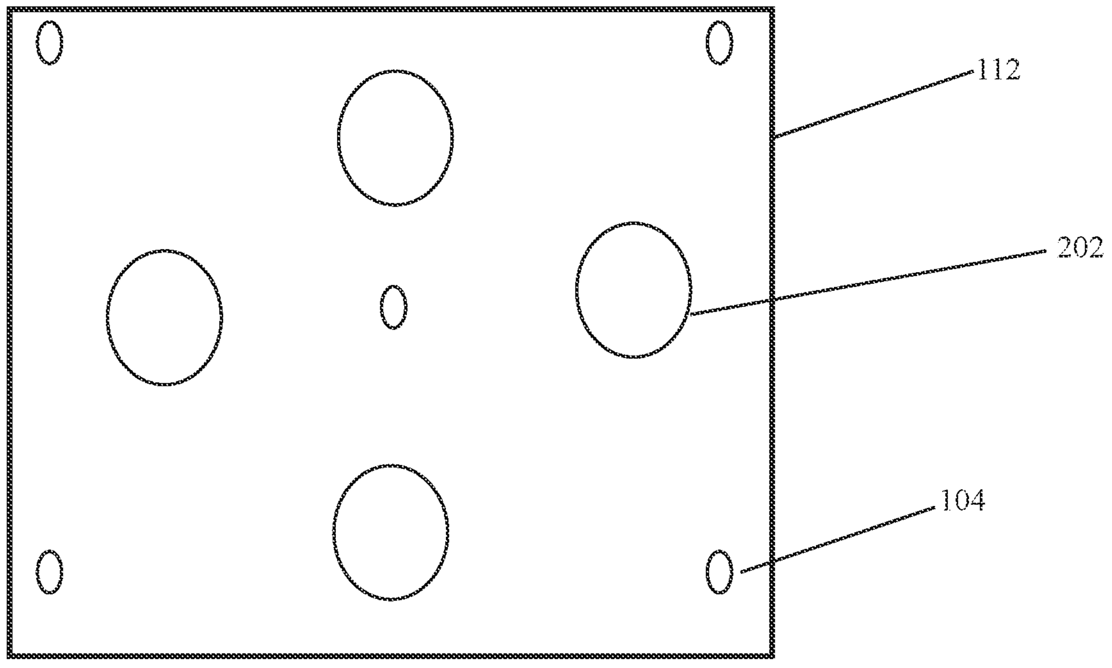
FIG. 2 illustrates an exemplary fixation element.

The one or more optional fixation elements 112 are made from any suitable material transparent to the transmissions of the antenna assembly 102. Examples of these materials are polycarbonate and FR4. The one or more optional fixation elements 112 may be simple solid polygonal (e.g., square) or circular plates. Alternatively, to reduce the weight of the one or more optional fixation elements 112, material may be omitted from the plates provided sufficient structural stability is still retained. FIG. 2 illustrates an exemplary fixation element 112 formed from a square plate of polycarbonate having a thickness of 0.236 cm (0.093"). The weight of such a plate could be reduced some by placing optional holes 202 in the plate.

The electronics box 114 acts as a counterpoise to extend the frequency of operation downward, increase the power provided at lower frequencies, or both by increasing efficiency at low frequencies. The overall counter-RCIED system 100 can be thought of as a dipole antenna where the non-flexible antenna element 106 serves as the midpoint providing high frequency coverage, and the flexible elements 104 and electronics box 114 serve as the top and bottom, respectively, providing low frequency coverage. The weight of the electronics box 114 should be kept as low possible to make the counter-RCIED system 100 lighter, especially since such counter-RCIED systems 100 are advantageously man-portable. The electronics box 114 should have a height, of no larger than 30.5 cm (12"), advantageously no larger than 27.9 cm (11"), or even more advantageously no larger than 26.7 cm (10.5"). The electronics box 114 should have a weight of no larger than 7.71 kg (17.0 lbs.), advantageously no larger than 7.26 kg (16.0 lbs.), or even more advantageously no larger than 6.81 kg (15.0 lbs.).

Exemplary Antenna Assembly and Electronics Box

Figure 3:
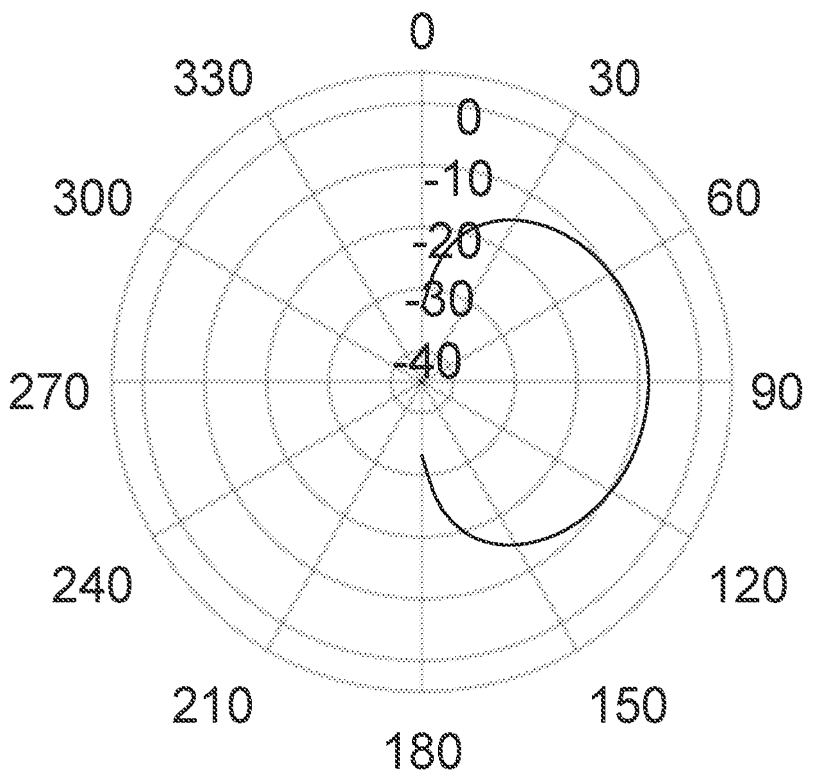
FIG. 3 shows the elevation pattern plot for the lower portion of the frequency range of an exemplary antenna assembly and electronics box.
Figure 4:
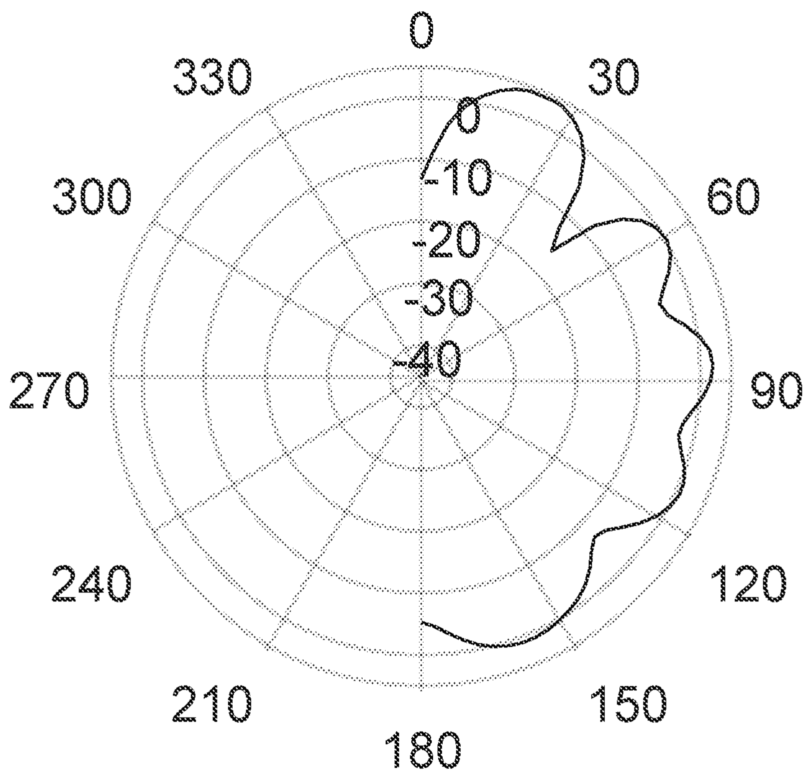
FIG. 4 shows the elevation pattern plot for the middle portion of the frequency range of the exemplary antenna assembly and electronics box.
Figure 5:
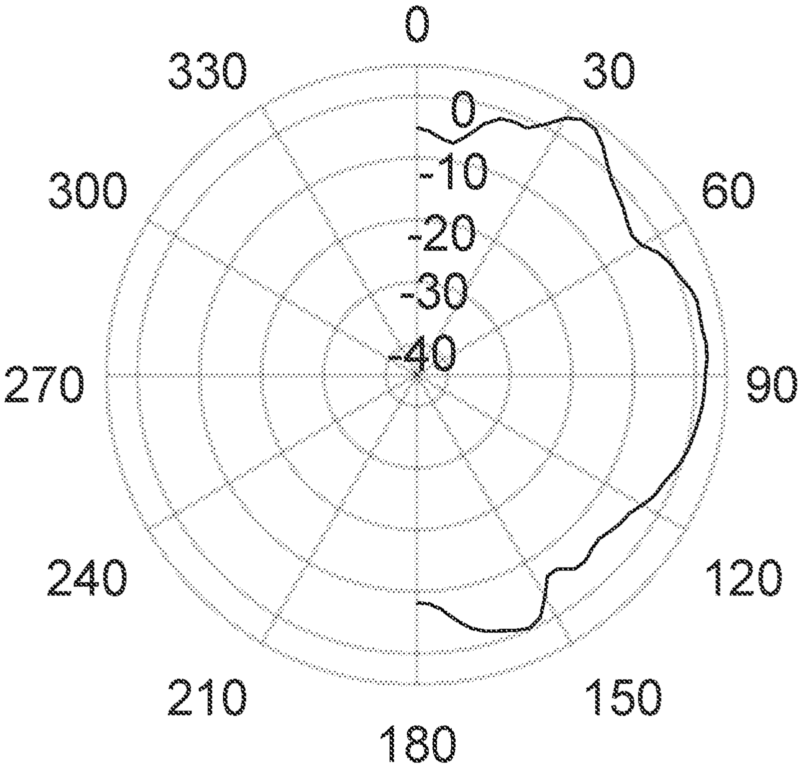
FIG. 5 shows the elevation pattern plot for the higher portion of the frequency range of the exemplary antenna assembly and electronics box.

The antenna assembly 102 and electronics box 114 are combined in such a way to act as a single radiating unit, with the antenna assembly 102 mounted vertically above the electronics box 114. The antenna assembly 102 makes an electrical connection to the electronics box 114 via a coaxial cable which supplies the electrical impulses from an amplifier unit in the electronics box 114 to the antenna assembly 102. Electrical impulses, or currents, flow on the inside of the coaxial cable, and the outside of the coax cable establishes a path for currents radiating from the antenna assembly 102 to flow on the exterior of the electronics box 114. The electronics box 114 then acts as an electrical counterpoise, providing a path for current to flow. Electrical currents flowing over wider surface areas produce radiation patterns that are more directive. Since the electronics box 114 is beneath the antenna assembly 102, and is wider and has more surface area, energy is radiated upwards away from the ground thereby enhancing the effectiveness of the jamming system. FIGS. 3-5 show the elevation patterns of the exemplary antenna assembly 102 and electronics box 114, and a slightly downward tilt in the radiation pattern towards the ground is seen in the pattern being higher in elevation angles >90°.

FIG. 3 shows the elevation pattern plot for the lower portion of the frequency range of the exemplary antenna assembly 102 and electronics box 114.

FIG. 4 shows the elevation pattern plot for the middle portion of the frequency range of the exemplary antenna assembly 102 and electronics box 114.

FIG. 5 shows the elevation pattern plot for the higher portion of the frequency range of the exemplary antenna assembly 102 and electronics box 114.

Figure 6:
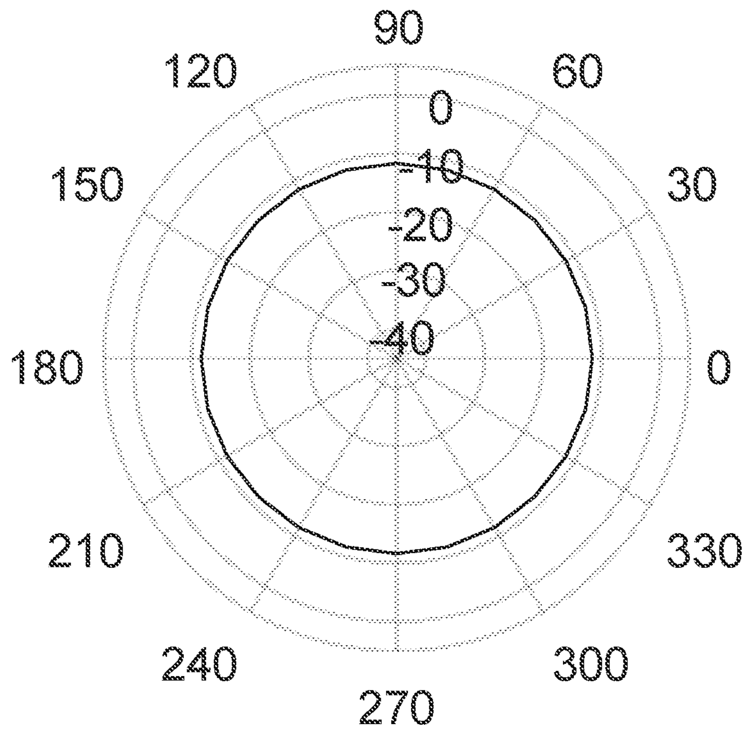
FIG. 6 shows the azimuth pattern plot for the lower portion of the frequency range of the exemplary antenna assembly and electronics box.

FIG. 6 shows the azimuth pattern plot for the lower portion of the frequency range of the exemplary antenna assembly 102 and electronics box 114.

Figure 7:
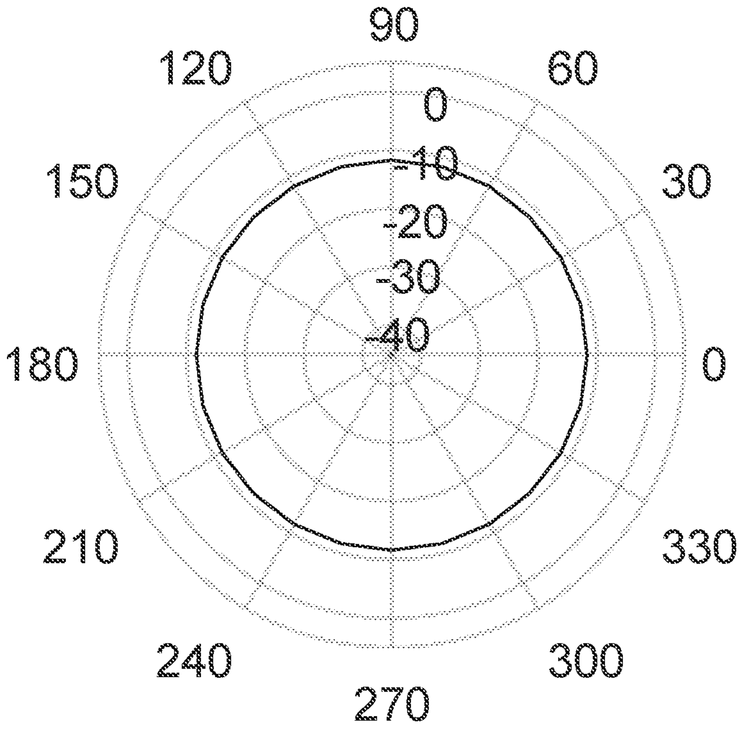
FIG. 7 shows the azimuth pattern plot for the middle portion of the frequency range of the exemplary antenna assembly and electronics box.

FIG. 7 shows the azimuth pattern plot for the middle portion of the frequency range of the exemplary antenna assembly 102 and electronics box 114.

Figure 8:
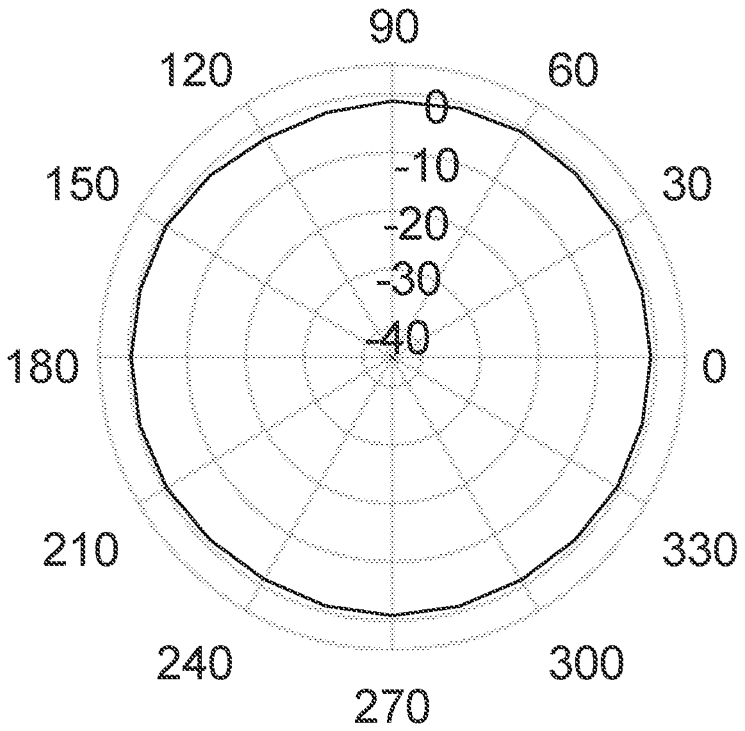
FIG. 8 shows the azimuth pattern plot for the higher portion of the frequency range of the exemplary antenna assembly and electronics box.

FIG. 8 shows the azimuth pattern plot for the higher portion of the frequency range of the exemplary antenna assembly 102 and electronics box 114.

Figure 9:
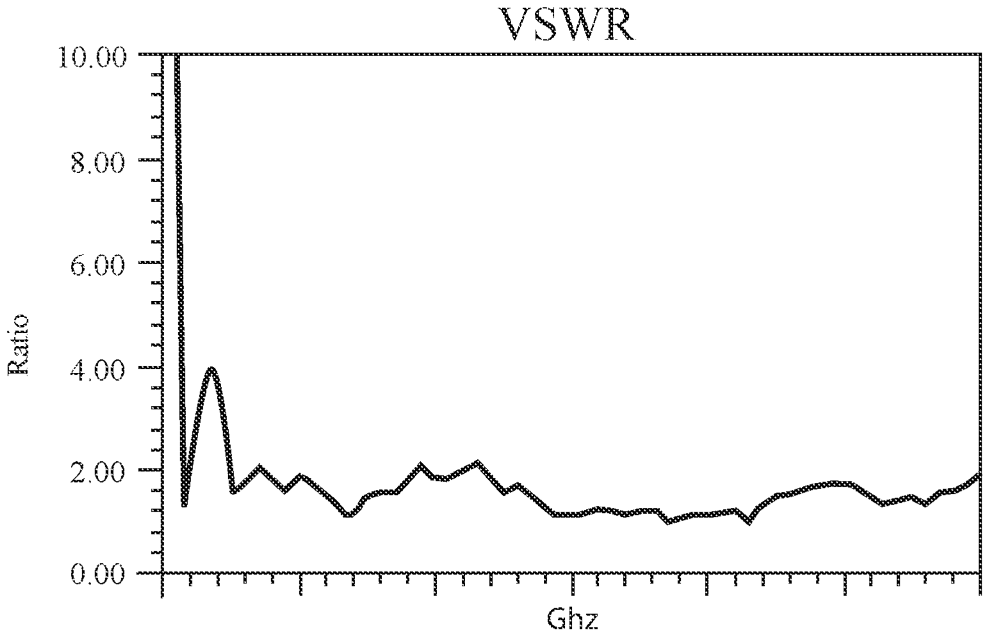
FIG. 9 shows the VSWR plot for the exemplary antenna assembly and electronics box.

FIG. 9 shows the VSWR plot for the exemplary antenna assembly 102 and electronics box 114. The electrical impedance behavior of the exemplary antenna assembly 102 and electronics box 114, with a Voltage Standing Wave Ratio (VSWR) which is less than 2:1 across the frequency range.

Figure 10:
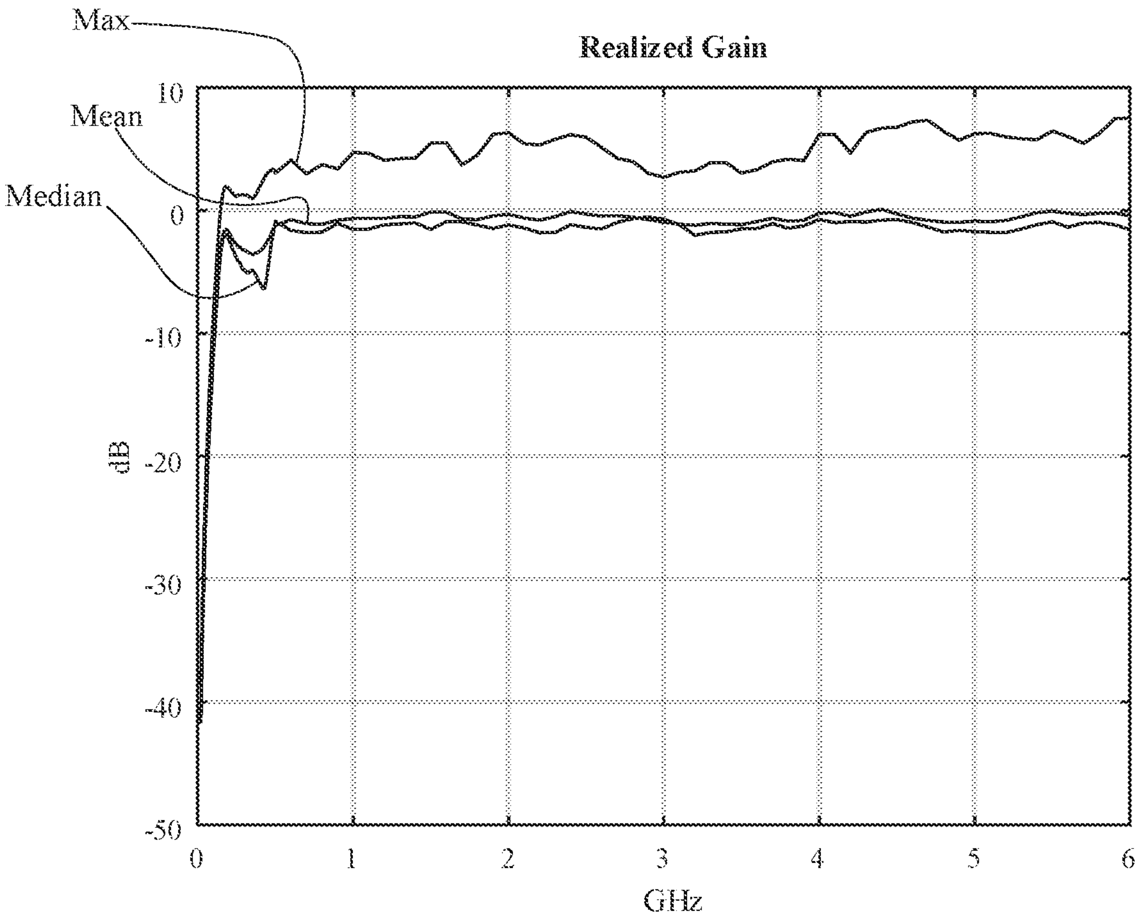
FIG. 10 shows the realized gain for the exemplary antenna assembly and electronics box.

FIG. 10 shows the realized gain for the exemplary antenna assembly 102 and electronics box 114.

Figure 11:
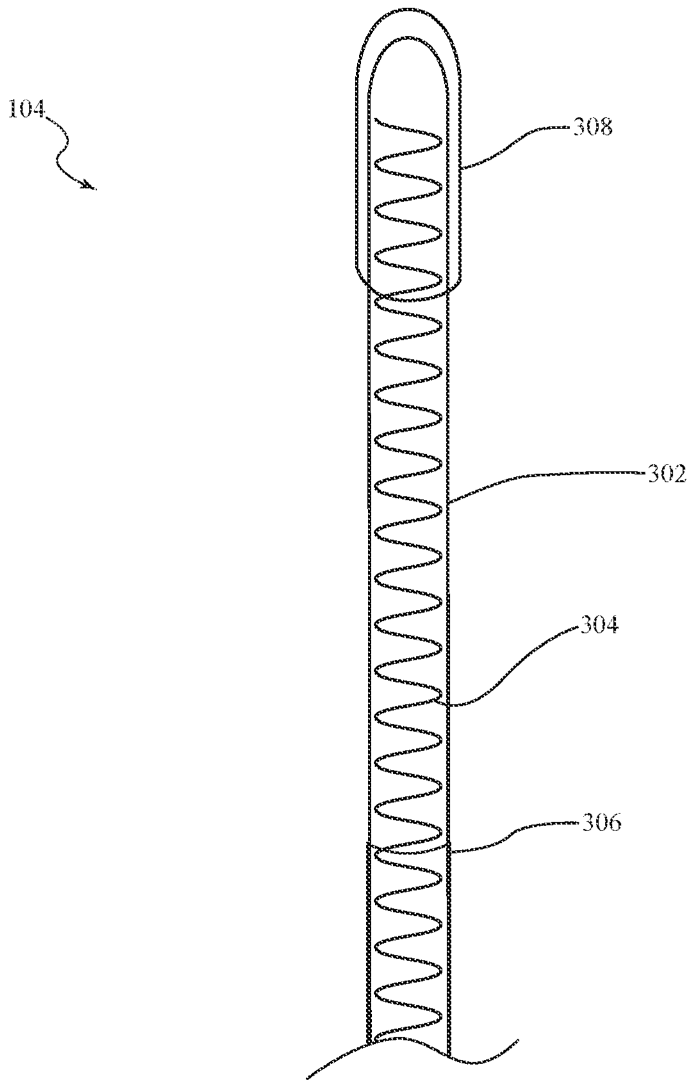
FIG. 11 illustrates an exemplary structure of the flexible antenna element.

FIG. 11 illustrates an exemplary structure of the flexible antenna element 104 including a rubberized coating 302 over a spring material 304 with a heat shrink 306 partially covering the rubberized coating 302 and an end cap 308. The material used for the spring material 304 may be a COTS spring material. The spring material 304 may be covered with the rubberized coating 302 and may include the end cap 308 at one end. At the end opposite the end where the end cap 308 is located, the rubberized coating 302 may be omitted or removed to facilitate connection of the flexible antenna element 104 within the antenna assembly 102 (not illustrated). Heat shrink 306 may be optionally added to the portion next to the exposed spring material 304 for supplemental wear protection and stability. The remainder of the rubberized coating 302 is left untouched until the other end of the exemplary flexible antenna element 104 in which an end cap 308 is installed for human safety considerations. The end cap 308 primarily serves to prevent injury which may otherwise occur due to the sharp and pointy metal edges of the spring material 304.

The upper and lower frequency ranges of the antenna are determined by the overall electrical length of the antenna assembly 102 and electronics box 114 combined and the shape of the non-flexible antenna element 106. The low frequency limit of an antenna is inversely proportional to the electrical length of the entire antenna which typically results in longer, wider antennas being utilized at lower frequencies than shorter, narrower antennas. Antennas that are electrically too short have a very high input impedance which establishes the lower frequency limit. Increasing the electrical length of an antenna is primarily achieved in two ways. The first is to add the electronics box 114 as a counterpoise, which proportionally increases the electrical length. The second is to add an inductance. The inductance comes from the flexible antenna elements 104 that are tightly spaced in the upper section of the antenna assembly 102. The upper frequency limit is determined by the shape of the conical sections of the non-flexible antenna element 106. At high frequencies, the wavelength is very small with respect to the overall size of the antenna assembly 102, and current density decreases rapidly moving away from the coaxial feed point 404. Therefore, at high frequencies, the input impedance of the antenna assembly 102 is almost completely determined by shapes and electrical features in the non-flexible antenna element 106 (middle section), and less so for features like the flexible antenna elements 104 on the upper section of the antenna assembly 102 or even the electronics box 114. The conical section has been designed to taper from a narrow point to a larger diameter to maintain a nearly constant ratio of electrical voltage to electrical currents as frequency increases.

The present invention is useful for man-pack (backpack), man-portable (hand-carried by personnel or robot), and vehicular applications.

The present invention provides broadband frequency coverage in an electrically small package. "Electrically small" describes an antenna much shorter than the wavelength of the signal it is intended to transmit or receive. The antenna assembly of the present invention provides the desired antenna performance in a package that is inexpensive, serviceable, lightweight, and rugged.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

REFERENCE NUMERALS AND DESIGNATIONS

100 counter-RCIED system
102 antenna assembly
104 flexible antenna elements
106 non-flexible antenna element
108 central flexible antenna element
110 peripheral flexible antenna element
112 fixation element
114 electronics box
116 height
202 hole
302 rubberized coating
304 exposed spring material
306 heat shrink
308 end cap
402 tapered shape
404 coaxial feed point

What is claimed is:

1. An antenna assembly comprising:
flexible antenna elements connected to a non-flexible antenna element, and
a counterpoise connected to the non-flexible antenna element such that the non-flexible antenna element is between the counterpoise and the flexible antenna elements,
wherein the flexible antenna elements are a plurality of peripheral flexible antenna elements and a central flexible antenna element, the plurality of peripheral flexible antenna elements are separated from and surrounding the central flexible antenna element,
wherein the non-flexible antenna element is a biconical antenna, formed from two tapered shapes connected at a central feed point having a constant electrical impedance as the currents radiate outward from the central feed point,
wherein a total length of the flexible antenna elements connected to the non-flexible antenna element is no greater than 43.0 cm, and
wherein the flexible antenna elements connected to the non-flexible antenna element has a realized gain of at least 2 dB over at least a frequency range of 200 MHz to 7 GHz.

2. The antenna assembly of claim 1, wherein the total length of the flexible antenna elements connected to the non-flexible antenna element is no greater than 41.7 cm.

3. The antenna assembly of claim 1, wherein the total length of the flexible antenna elements connected to the non-flexible antenna element is no greater than 40.4 cm.

4. The antenna assembly of claim 1, wherein a total weight of the flexible antenna elements connected to the non-flexible antenna element is no greater than 1.36 kg.

5. The antenna assembly of claim 1, wherein a total weight of the flexible antenna elements connected to the non-flexible antenna element is no greater than 1.13 kg.

6. The antenna assembly of claim 1, wherein a total weight of the flexible antenna elements connected to the non-flexible antenna element is no greater than 0.91 kg.

7. The antenna assembly of claim 1, wherein the flexible antenna elements connected to the non-flexible antenna element has the realized gain of at least 1 dB over at least a frequency range of 100 MHz to 7 GHz.

8. The antenna assembly of claim 1, wherein the flexible antenna elements connected to the non-flexible antenna element has the realized gain of at least 0 dB over at least a frequency range of 30 MHz to 7 GHz.

9. The antenna assembly of claim 1, wherein the flexible antenna elements connected to the non-flexible antenna element is a single antenna.

10. The antenna assembly of claim 1, wherein the plurality of peripheral flexible antenna elements are equidistance from the central flexible antenna element.

11. The antenna assembly of claim 10, wherein the plurality of peripheral flexible antenna elements are spaced an equal number of radians from each other relative to the central flexible antenna element.

12. The antenna assembly of claim 1, wherein the central flexible antenna element is identical to each of the plurality of peripheral flexible antenna elements.

13. The antenna assembly of claim 1, wherein the central flexible antenna element is different from each of the plurality of peripheral flexible antenna elements.

14. The antenna assembly of claim 1, further comprising:
an electronics box,
wherein the non-flexible antenna element is connected to an electronics box, and
wherein the electronics box acts as a counterpoise.

15. The antenna assembly of claim 14, wherein the antenna assembly is man-pack portable or man-portable.

16. The antenna assembly of claim 1, wherein the non-flexible antenna element is defined by the equation $Z(r, \alpha, \delta)=\delta\times r^{\alpha}$, where r, is the radial distance from the center of the cone, $\alpha$ is the taper profile exponent factor, and $\delta$ is the height of the taper profile from the central feed point.

17. An antenna assembly comprising:

flexible antenna elements connected to a non-flexible antenna element; and a counterpoise connected to the non-flexible antenna element such that the non-flexible antenna element is between the counterpoise and the flexible antenna elements, wherein the flexible antenna elements are a plurality of peripheral flexible antenna elements and a central flexible antenna element, the plurality of peripheral flexible antenna elements are separated from and surrounding the central flexible antenna element, wherein the non-flexible antenna element is a biconical antenna including two cone tapers, wherein a total length of the flexible antenna elements connected to the non-flexible antenna element is no greater than 40.4 cm, wherein a total weight of the flexible antenna elements connected to the non-flexible antenna element is no greater than 0.91 kg, wherein the flexible antenna elements connected to the non-flexible antenna element has a realized gain of at least 0 dB over at least a frequency range of 30 MHz to 7 GHz, wherein the plurality of peripheral flexible antenna elements are equidistance from the central flexible antenna element and the plurality of peripheral flexible antenna elements are spaced an equal number of radians from each other relative to the central flexible antenna element, and wherein the antenna assembly is a single antenna.

18. An antenna assembly comprising:

flexible antenna elements connected to a non-flexible antenna element; and a counterpoise connected to the non-flexible antenna element such that the non-flexible antenna element is between the counterpoise and the flexible antenna elements, wherein the flexible antenna elements are a plurality of peripheral flexible antenna elements and a central flexible antenna element, the plurality of peripheral flexible antenna elements are separated from and surrounding the central flexible antenna element, wherein the non-flexible antenna element is defined by the equation $Z(r, \alpha, \delta)=\delta \times r^{\alpha}$, where r, is the radial distance from the center of the cone, $\alpha$ is the taper profile exponent factor, and $\delta$ is the height of the taper profile from the central feed point, wherein the flexible antenna elements connected to the non-flexible antenna element has a realized gain of 0 dB over at least a frequency range of 30 MHz to 7 GHz, wherein the plurality of peripheral flexible antenna elements are equidistance from the central flexible antenna element and the plurality of peripheral flexible antenna elements are spaced an equal number of radians from each other relative to the central flexible antenna element, and wherein the antenna assembly is a single antenna.

* * * * *